(12) United States Patent
Yatka et al.

(10) Patent No.: US 6,264,999 B1
(45) Date of Patent: *Jul. 24, 2001

(54) CHEWING GUM CONTAINING ERYTHRITOL AND METHOD OF MAKING

(75) Inventors: Robert J. Yatka, Orland Park; Mansukh M. Patel, Downers Grove; Henry T. Tyrpin, Palos Heights; Kevin B. Broderick, Berwyn, all of IL (US)

(73) Assignee: Wm. Wrigley Jr. Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/619,561

(22) PCT Filed: Sep. 30, 1993

(86) PCT No.: PCT/US93/09354

§ 371 Date: Mar. 26, 1996

§ 102(e) Date: Mar. 26, 1996

(87) PCT Pub. No.: WO95/08925

PCT Pub. Date: Apr. 6, 1995

(51) Int. Cl.⁷ .................................................. A23G 3/30
(52) U.S. Cl. ................................................ 426/3
(58) Field of Search .................. 426/3, 4, 5, 6, 426/548

(56) References Cited

U.S. PATENT DOCUMENTS

| | | |
|---|---|---|
| 3,899,593 | 8/1975 | Hammond et al. . |
| 4,065,578 | 12/1977 | Reggio et al. . |
| 4,671,961 | 6/1987 | Patel et al. . |
| 4,671,967 * | 6/1987 | Patel et al. ............................ 426/3 X |
| 4,728,515 | 3/1988 | Patel et al. . |
| 4,902,525 | 2/1990 | Kondou . |
| 4,931,294 | 6/1990 | Yatka et al. . |
| 4,933,188 | 6/1990 | Cherukuri et al. . |
| 5,043,169 * | 8/1991 | Cherukuri et al. ........................ 426/5 |
| 5,080,916 | 1/1992 | Kondou . |
| 5,120,550 * | 6/1992 | Van der Schuesen ................... 426/3 |
| 5,156,866 | 10/1992 | Sato et al. . |
| 5,296,244 * | 3/1994 | Yatka ....................................... 426/3 |
| 5,397,579 | 3/1995 | Yatka et al. . |
| 5,494,685 | 2/1996 | Tyrpin et al. . |
| 5,536,511 | 7/1996 | Yatka et al. . |
| 5,545,415 | 8/1996 | Tyrpin et al. . |
| 5,603,970 | 2/1997 | Tyrpin et al. . |
| 5,612,070 * | 3/1997 | Yatka et al. ............................... 426/3 |
| 5,973,212 | 10/1999 | De Sadeleer et al. ............... 568/852 |

FOREIGN PATENT DOCUMENTS

| | | |
|---|---|---|
| 0 009 325 A1 | 4/1980 | (EP) . |
| 0 325 790 A2 | 8/1989 | (EP) . |
| 0497439 * | 5/1992 | (EP) . |
| 0 511 761 A1 | 11/1992 | (EP) . |
| 0 530 995 A1 | 3/1993 | (EP) . |
| 0 758 528 A1 | 2/1997 | (EP) . |
| 56-18180 | 4/1981 | (JP) . |
| 64-51045 | 5/1989 | (JP) . |
| 64-225458 | 9/1989 | (JP) . |
| 65-104259 | 4/1990 | (JP) . |
| 4-287658 | 10/1992 | (JP) . |
| 4-287659 | 10/1992 | (JP) . |
| 5-137535 | 6/1993 | (JP) . |
| 92/22217 * | 12/1992 | (WO) . |
| 93/00828 * | 1/1993 | (WO) . |
| 93/06740 * | 4/1993 | (WO) . |
| WO 95/08925 | 4/1995 | (WO) . |
| WO 95/08928 | 4/1995 | (WO) . |

OTHER PUBLICATIONS

Brochure entitled "Erythritol: new horizons in low–calory food ingredients", 4 pages, published by Cerestar, circa Feb. 1994.

*Confectionary Production*, "Erythritol: a new sweetner", pp. 182–184, 186–187, 193, Mar. 1994.

*Confectionary Production*, "New horizons in low–calorie bulk sweetners", pp. 637–638, Aug. 1993.

* cited by examiner

*Primary Examiner*—Arthur L. Corbin
(74) *Attorney, Agent, or Firm*—Brinks Hofer Gilson & Lione

(57) ABSTRACT

Chewing gums containing erythritol and methods of making such gums are disclosed. In one embodiment, the gum comprises about 5% to about 95% gum base, about 0.1% to about 10% flavoring agent and erythritol, the erythritol being the only bulk sweetener. The erythritol provides the gum with unique properties, and the gum may be non-cariogenic. In other embodiments, the erythritol is co-dried with other sweeteners or coevaporated with a plasticizing syrup to produce unique sweetening ingredients and syrups for gum.

10 Claims, No Drawings

CHEWING GUM CONTAINING ERYTHRITOL AND METHOD OF MAKING

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf life properties. The improved chewing gum compositions may also be used in a variety of chewing gum products, such as confectionery coated chewing gum products.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers. The non-sugar polyols have the advantage of not contributing to dental caries of consumers, as well as being able to be consumed by diabetics.

One such polyol bulking agent is called erythritol. This polyol bulking agent or bulk sweetener is not approved for use in human food products or in chewing gum in the U.S. However, a GRAS affirmation petition for erythritol as a human food ingredient is currently being prepared. Erythritol does not contribute to dental caries, does not significantly contribute to calories and does not cause gastric distress like some other polyols. Thus, this ingredient's use in chewing gum could be a definite improvement.

A chewing gum made with a sweetening agent containing erythritol and a liquid sugar or sugar alcohol is disclosed in U.S. Pat. No. 5,120,550.

A method of reducing dental caries by administering a sugarless chewing gum made with erythritol is disclosed in European Patent Publication No. 0 009 325.

Low-caloric sweetening compositions containing meso-erythritol are disclosed in U.S. Pat. No. 5,080,916 and No. 4,902,525 and Japanese Patent Publications No. 89-225458 and 90-104259. Japanese Patent Publication No. 89-51045 discloses chewing gum made with a melted mixture of mesoerythritol and sugars or sugar alcohols.

A sweetener employing the use of spray dried erythritol is disclosed in European Patent Publication No. 0 497 439.

A sweetening composition made up of erythritol, sorbitol and a glucose oligomer is disclosed in European Patent Publication No. 0 511 761.

SUMMARY OF THE INVENTION

The present invention is a method of producing chewing gum with a new bulk sweetener, specifically erythritol, as well as the chewing gum so produced. The bulk sweetener may be added to sucrose-type gum formulations, replacing a small or large quantity of sucrose. The formulation may be a low- or high-moisture formulation containing low or high amounts of moisture-containing syrup. The bulk sweetener, erythritol, may also be used in low- or non-sugar gum formulations replacing sorbitol, mannitol, or other polyols. Non-sugar formulations may include low- or high-moisture, sugar-free chewing gums.

The bulk sweetener, erythritol, may be combined with other bulk sweeteners for use in chewing gum, including but not limited to sucrose, dextrose, fructose, maltose, maltodextrin and xylose, as well as sugar alcohols including but not limited to sorbitol, mannitol, xylitol, maltitol, hydrogenated isomaltulose, lactitol and Lycasin brand hydrogenated starch hydrolysate. The bulk sweetener, erythritol, may be combined in the gum formulation or co-dried or blended with the other bulk sweeteners prior to use in the gum formulation. Co-drying may be done by various methods of spray drying, fluid bed coating, coacervation and other granulating or agglomerating techniques. The bulk sweetener, erythritol, may also be combined with high-intensity sweeteners including, but not limited to, thaumatin, aspartame, acesulfame K, sodium saccharin, glycyrrhizin, alitame, cyclamate, stevioside, sucralose and dihydrochalcones.

This sweetener, erythritol, when used according to the present invention, gives chewing gum an improved texture, an improved shelf life and a unique flavor/sweetness quality. Even though erythritol has some properties like sucrose, it is not cariogenic, and does not significantly contribute to calories, giving a highly consumer-acceptable chewing gum product.

DETAILED DESCRIPTION OF THE PREFERRED EMBODIMENTS

All percentages herein are weight percentages unless otherwise specified. The term "chewing gum" also includes bubble gum and the like.

Erythritol material is obtained by fermenting glucose with specially selected yeast strains in appropriate aqueous nutrient media or by treating an aqueous alkali carbonate solution of 2-buten-1,4-diol with chlorine and saponifying the resulting chlorohydrin.

Erythritol is a polyol that has a sweetness level of about 75% of that of sucrose. Erythritol is available as a powder, has good storage stability, and has a melting point of about 119° C. A syrup may be formed at concentrations below 40%, the maximum solubility of erythritol at room temperature. At high temperatures, higher concentrations may be used.

Erythritol may be added to chewing gum in its solid or syrup form. Erythritol may be used in chewing gum as a texture and flavor modifier, bulking agent, and may improve texture, flavor and shelf life properties. Erythritol may replace solids like sucrose, dextrose, lactose, sorbitol or mannitol when used in its powder form, or may replace syrups when used in its liquid or syrup form. At levels of about 0.5% to about 25%, erythritol may replace part of the bulk sweeteners in sugar gum or, as a liquid, all or part of the syrup in sugar gum. At higher levels of about 25% to about 90% of the gum formulation, erythritol may replace all of the bulk sweeteners in a chewing gum formulation.

Unique chewing gum formulations can be obtained when all bulk sweeteners are replaced with erythritol powder and syrup. The relatively low sweetness intensity allows for use of unique flavor combinations, such as the use of savory and snack flavors. High-intensity sweeteners may be added to increase sweetness to obtain more typical chewing gum formulations. Chewing gum formulations with high levels of erythritol would be softer and less hygroscopic than sugar-containing gum formulations. Chewing gum formulations with erythritol may contain a very low amount of moisture in the gum formulation, i.e., below about 2%, or may contain a medium amount of moisture, about 2–5%, and may even be a soft gum formulation containing 5% moisture or more.

Although erythritol has properties like sucrose, and since it is a polyol, it may be used in chewing gum formulations containing non-sugar ingredients. Non-sugar ingredients are polyols such as sorbitol, mannitol, xylitol, hydrogenated isomaltulose, maltitol, lactitol and hydrogenated starch hydrolysate. These polyols are used in a variety of combinations to develop unique sugarless chewing gum formulations. Erythritol may be used to replace the individual polyols or combinations of polyols. With partial replacement of one or more polyols, erythritol can be used at levels of about 0.5–25%. If erythritol replaces a large amount or most of the polyols, this level may be about 25% to about 90% of the gum formulation.

Some sugar-free chewing gum formulations contain high levels of glycerin and are very low in moisture, i.e., less than about 2%. Erythritol, solids or syrup, may replace part or all of the glycerin used in these types of formulations. At higher moisture levels (more than 2%) in sugar-free gum, a liquid sorbitol (70% sorbitol, 30% water) is used. Erythritol solids or erythritol syrup may replace part or all of the sorbitol liquid. Sugar-free syrups like hydrogenated starch hydrolysate (HSH), such as Lycasin brand HSH, may also be replaced in part or totally by erythritol solids or syrup. The same product advantages found with hydrogenated starch hydrolysate syrups, such as improved product shelf life, improved texture and improved aspartame and alitame stability, may also be found with the use of erythritol solids or syrup.

HSH and glycerin are preblended and co-evaporated to reduce moisture in some sugar-free gum formulations. Erythritol solids and/or syrup may be used to replace part or all of the HSH/glycerin blends in chewing gum formulations. Aqueous erythritol syrup may also replace HSH in the preblend with glycerin and be co-evaporated with glycerin to obtain a low moisture, non-crystallizable blend. Combinations of erythritol solids/syrup with polyols like sorbitol, maltitol, xylitol and mannitol in aqueous form may also be blended with glycerin and co-evaporated for use in low-moisture, sugar-free gum.

In a similar manner, erythritol solids/syrup preblended in glycerin and co-evaporated may be used in conventional sugar chewing gum formulations. Erythritol may be combined with sugars like dextrose, sucrose, lactose, maltose, invert sugar, fructose and corn syrup solids to form a liquid mix to be blended with glycerin and co-evaporated. Erythritol solids/syrup may also be mixed with conventional syrup and blended with glycerin and co-evaporated for use in a sugar chewing gum formulation.

Erythritol bulk sweetener may be co-dried with a variety of sugars such as sucrose, dextrose, lactose, fructose and corn syrup solids, and used in a sugar-containing gum formulation. Erythritol may also be co-dried with a variety of other polyols, such as sorbitol, mannitol, xylitol, maltitol, hydrogenated isomaltulose, lactitol and hydrogenated starch hydrolysate, and used in a sugar-free gum formulation. Co-drying refers to methods of co-crystallization and co-precipitation of erythritol with sugars and other polyols, as well as co-drying by encapsulation, agglomeration and absorption with other sugars and polyols.

Co-drying by encapsulation, agglomeration and absorption can also include the use of encapsulating and agglomerating agents. Erythritol may be mixed with sugars or other polyols prior to being redried by encapsulation or agglomeration, or may be used alone with the encapsulating and agglomerating agents. These agents modify the physical properties of the bulk sweetener and control its release from chewing gum. Since erythritol is highly soluble in water as noted earlier, controlling the release of erythritol modifies the texture and flavor of the chewing gum.

Physical modifications of the bulk sweetener by encapsulation with another substrate will slow its release in chewing gum by reducing the solubility or dissolution rate. Any standard technique which gives partial or full encapsulation of the bulk sweetener can be used. These techniques include, but are not limited to, spray drying, spray chilling, fluid-bed coating and coacervation. These encapsulation techniques that give partial encapsulation or full encapsulation can be used individually or in any combination in a single step process or multiple step process. Generally, delayed release of bulk sweetener is obtained in multistep processes like spray drying the bulk sweetener and then fluid-bed coating the resultant powder.

The encapsulation techniques here described are standard coating techniques and generally give varying degrees of coating from partial to full coating, depending on the coating composition used in the process. Also, the coating compositions may be susceptible to water permeation to various degrees. Generally, compositions that have high organic solubility, good film-forming properties and low water solubility give better delayed release of the bulk sweetener. Such compositions include acrylic polymers and copolymers, carboxyvinyl polymer, polyamides, polystyrene, polyvinyl acetate, polyvinyl acetate phthalate, polyvinyl pyrrolidone, and waxes. Although all of these materials are possible for encapsulation of the bulk sweetener, only food-grade material should be considered. Two standard food-grade coating materials that are good film formers but not water-soluble are shellac and Zein. Others which are more water soluble, but good film formers, are materials like agar, alginates, a wide range of cellulose derivatives like ethyl cellulose, methyl cellulose, sodium hydroxymethyl cellulose and hydroxypropylmethyl cellulose, dextrin, gelatin, and modified starches. These ingredients, which are generally approved for food use, also give a delayed release when used as an encapsulant. Other encapsulants, like acacia or maltodextrin, can also encapsulate erythritol, but may increase the release rate of the bulk sweetener.

The amount of coating or encapsulating material on the bulk sweetener also controls the length of time for its release from chewing gum. Generally, the higher the level of coating, the slower the release of the bulk sweetener during mastication. The release rate is generally not instantaneous, but gradual over an extended period of time.

Another method of giving a delayed release of the bulk sweetener is agglomeration of the bulk sweetener with an agglomerating agent which partially coats the bulk sweetener. This method includes the step of mixing the bulk sweetener and agglomerating agent with a small amount of water or solvent. The mixture is prepared in such a way as to have individual wet particles in contact with each other so that a partial coating can be applied. After the water or solvent is removed, the mixture is ground and used as a powdered, coated bulk sweetener.

Materials that can be used as the agglomerating agent are the same as those used in encapsulation mentioned previously. However, since the coating is only a partial encapsulation and the bulk sweetener is water soluble, some agglomerating agents are more effective in delaying the sweetener release than others. Some of the better agglomerating agents are the organic polymers like acrylic polymers and copolymers, polyvinyl acetate, polyvinyl pyrrolidone, waxes, shellac and Zein. Other agglomerating agents are not as effective in giving the bulk sweetener a delayed release as are the polymers, waxes, shellac and Zein, but can be used to give some delayed release. These other agglomerating agents include, but are not limited to, agar, alginates, a wide range of cellulose derivatives like ethyl cellulose, methyl cellulose, sodium hydroxymethyl cellulose and hydroxypropylmethyl cellulose, dextrin, gelatin, modified starches, and vegetable gums like guar gum, locust bean gum and carrageenin. Even though the agglomerated bulk sweetener is only partially coated, when the quantity of coating is increased compared to the quantity of the bulk sweetener, the release of the bulk sweetener can be delayed for a longer time during mastication.

The bulk sweetener may be coated in a two-step process or multiple-step process. The bulk sweetener may be encapsulated with any of the materials as described previously and then the encapsulated sweetener can be agglomerated as described previously to obtain an encapsulated/agglomerated/bulk sweetener product that could be used in chewing gum to give a delayed release of bulk sweetener.

In another embodiment of this invention, erythritol sweetener may be absorbed onto another component which is porous and becomes entrapped in the matrix of the porous component. Common materials used for absorbing the bulk sweetener include, but are not limited to, silicas, silicates, pharmasorb clay, sponge-like beads or microbeads, amorphous sugars like spray-dried dextrose, sucrose, polyols, amorphous carbonates and hydroxides, including aluminum and calcium lakes, vegetable gums and other spray dried materials.

Depending on the type of absorbent material and how it is prepared, the amount of bulk sweetener that can be loaded onto the absorbent will vary. Generally materials like polymers, sponge-like beads or microbeads, amorphous sugars and polyols and amorphous carbonates and hydroxides absorb about 10% to about 40% of the weight of the absorbent. Other materials like silica and pharmasorb clays may be able to absorb about 20% to about 80% of the weight of the absorbent.

The general procedure for absorbing the bulk sweetener onto the absorbent is as follows. An absorbent like fumed silica powder can be mixed in a powder blender and an aqueous solution of the bulk sweetener can be sprayed onto the powder as mixing continues. The aqueous solution can be about 30% to 40% solids, and higher solid levels may be used if temperatures up to 90° C. are used. Generally water is the solvent, but other solvents like alcohol could also be used if approved for use in food. As the powder mixes, the liquid is sprayed onto the powder. Spraying is stopped before the mix becomes damp. The still free-flowing powder is removed from the mixer and dried to remove the water or other solvent, and ground to a specific particle size.

After the bulk sweetener is absorbed onto an absorbent or fixed onto an absorbent, the fixative/sweetener can be coated by encapsulation. Either full or partial encapsulation may be used, depending on the coating composition used in the process. Full encapsulation may be obtained by coating with a polymer as in spray drying, spray chilling, fluid-bed coating, coacervation, or any other standard technique. A partial encapsulation or coating can be obtained by agglomeration of the fixative/sweetener mixture using any of the materials discussed above.

The three methods of use to obtain a delayed release of bulk sweetener are: (1) encapsulation by spray drying, fluid-bed coating, spray chilling and coacervation to give full or partial encapsulation, (2) agglomeration to give partial encapsulation and (3) fixation or entrapment/absorption, which also gives partial encapsulation. These three methods, combined in any usable manner which physically isolates the bulk sweetener, reduces its dissolvability or slows down the release of bulk sweetener, are included in this invention.

Erythritol may be used with other bulk sweeteners and in combinations that give unique properties. Erythritol may be co-dried by various delayed release methods noted above with other bulk sweeteners like isomaltulose, sucrose, dextrose, lactose, maltose, fructose, corn syrup solids, sorbitol, mannitol, xylitol, maltitol, hydrogenated isomaltulose, lactitol and hydrogenated starch hydrolysate for use in sugar and sugar-free chewing gum.

Other methods of treating the erythritol bulk sweetener to physically isolate the sweetener from other chewing gum ingredients may also have some effect on its release rate and its effect on chewing gum flavor and texture. The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using erythritol bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the erythritol bulk sweetener from other chewing gum ingredients is to add erythritol to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises erythritol bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of the chewing gum composition. The amount of erythritol bulk sweetener added to the rolling compound is about 0.05% to 100% of the rolling compound, or about 0.005% to about 5% of the chewing gum composition. This method of using erythritol bulk sweetener in the chewing gum can allow a lower usage level of the bulk sweetener, can give the bulk sweetener a more controlled release rate, and can reduce or eliminate any possible reaction of the bulk sweetener with gum base, flavor components or other components, yielding improved shelf stability.

Another method of isolating the erythritol bulk sweetener is to use it in the coating/panning of a pellet chewing gum. Pellet or ball gum is prepared as conventional chewing gum, but formed into pellets that are pillow shaped or into balls. The pellets/balls can then be sugar coated or panned by conventional panning techniques to make a unique, sugar-coated pellet gum. The bulk sweetener is very stable and highly water soluble, and can be easily added to a sugar solution prepared for sugar panning. Erythritol may be combined with sucrose, or used alone in solution as the coating on pellet gum. Erythritol can also be added as a powder blended with other powders often used in some types of conventional panning procedures. Using erythritol sweetener isolates the sweetener from other gum ingredients and modifies its release rate in chewing gum. Levels of use of erythritol may be about 1% to about 100% in the coating and about 0.5% to about 50% of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Erythritol also acts as a panning modifier with other panning materials to improve product quality. Antitack agents may also be added as panning modifiers, which allow the use of a variety of carbohydrates and sugar alcohols to be used in the development of new panned or coated gum products. Flavors may also be added with the sugar coating and with the erythritol sweetener to yield unique product characteristics.

The previously described encapsulated, agglomerated or absorbed erythritol bulk sweetener may readily be incorporated into a chewing gum composition. The remainder of the chewing gum ingredients are noncritical to the present invention. That is, the coated particles of bulk sweetener can be incorporated into conventional chewing gum formulations in a conventional manner. The erythritol bulk sweeteners may be used in a sugar-free or sugar chewing gum to modify the sweetness thereof. The coated bulk sweetener may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, plasticizers, waxes, emulsifiers and inorganic fillers.

Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, isobutylene-isoprene copolymer and stirene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and cocoa butter. Commonly employed waxes include paraffin, microcrystalline and natural waxes such as beeswax and carnauba. Low melting point waxes may be considered to be plasticizers. High melting point waxes may be considered as bodying agents or textural modifiers.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Emulsifiers, which also sometimes have plasticizing properties, include glycerol monostearate, lecithin and glycerol triacetate. Further, gum bases may also contain optional ingredients such as antioxidants, colors and flavors. The present invention contemplates employing any commercially acceptable gum base.

According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The water-soluble portion of the chewing gum may further comprise softeners, sweeteners, flavoring agents and combinations thereof. The sweeteners often fulfill the role of bulking agents in the gum. The bulking agents typically comprise about 5% to about 90% of the gum composition. Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolysate, corn syrup and combinations thereof may be used as softeners and binding agents in gum.

As mentioned above, the erythritol solids/syrup bulk sweetener of the present invention will most likely be used in sugar-free gum formulations. However, sugar formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The erythritol solids/syrup bulk sweetener of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysate, maltitol, lactitol and the like, alone or in any combination.

Depending on the particular sweetness release profile and shelf-stability needed, the erythritol solid/syrup bulk sweeteners of the present invention can also be used in combination with coated or uncoated high-intensity sweeteners or with high-intensity sweeteners coated with other materials and by other techniques.

A flavoring agent may be present in the chewing gum in an amount within the range of from about 0.1 to about 10.0 weight percent, and preferably from about 0.5 to about 3.0 weight percent of the gum. The flavoring agents may comprise essential oils, synthetic flavors or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which erythritol can be added to gum after it is dissolved in water and mixed with various aqueous solvents.

Example 1

Erythritol powder can be added directly to the gum.

Example 2

An 80 gram portion of erythritol can be dissolved in 120 grams of water at 40° C., making a 40% solution, and added to gum.

Example 3

Erythritol syrup at 58% solids can be added directly to the gum.

Example 4

A blend of 80 grams of erythritol and 120 grams of water is mixed at 40° C. To this is added 100 grams of glycerin to give a mixture of 27% erythritol, 40% water and 33% glycerin, and added 45 to gum.

Example 5

To 140 grams of erythritol syrup at 58% solids is added 60 grams of glycerin to give a 70% erythritol syrup with 30% glycerin, and added to gum.

Example 6

To 140 grams of erythritol syrup of 58% solids is added 60 grams of propylene glycol, giving a 70% erythritol syrup with 30% propylene glycol, and added to gum.

Example 7

To 140 grams of erythritol syrup at 58% solids is added 89 grams of corn syrup and blended, giving a mixture of 61% erythritol syrup and 39% corn syrup.

Example 8

To a 200 gram quantity of corn syrup is added 100 grams of glycerin. To this mixture is added 75 grams of erythritol and blended at 50° C. This mixture is added to gum.

In the next examples of sugar gum formulations, erythritol can be dissolved in water and emulsifiers can be added to the aqueous solution. Example solutions can be prepared by dissolving 15 grams of erythritol in 70 grams water and adding 15 grams of emulsifiers of various hydrophilic-lipophilic balance (HLB) values to the solution. The mixtures can then be used in the following formulas. (Note: The aqueous solution of Example 9 does not use any emulsifier.)

TABLE 1

| | EX. 1 | EX. 2 | EX. 3 | EX. 4 | EX. 5 | EX. 6 | EX. 7 | EX. 8 |
|---|---|---|---|---|---|---|---|---|
| SUGAR | 55.6 | 56.6 | 55.6 | 47.0 | 53.0 | 53.0 | 55.6 | 47.0 |
| BASE | 19.2 | 9.2 | 19.2 | 19.2 | 19.2 | 19.2 | 19.2 | 19.2 |
| CORN SYRUP | 12.9 | 1.9 | 8.9 | 2.9 | 6.9 | 6.9 | 0.0 | 2.9 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| ERYTHRITOL/LIQUID BLEND | 10.0 | 20.0 | 14.0 | 30.0 | 20.0 | 20.0 | 22.9 | 30.0 |

TABLE 2

|  | EX. 9 | EX. 10 | EX. 11 | EX. 12 | EX. 13 | EX. 14 |
|---|---|---|---|---|---|---|
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.9 | 12.9 | 12.9 | 12.9 | 12.9 | 12.9 |
| GLYCERIN | 1.4 | 1.4 | 1.4 | 1.4 | 1.4 | 1.4 |
| DEXTROSE/ MONOHYDRATE | 9.9 | 9.9 | 9.9 | 9.9 | 9.9 | 9.9 |
| PEPP. FLAVOR | 0.9 | 0.9 | 0.9 | 0.9 | 0.9 | 0.9 |
| BULK SWEETENER/ EMULSIFIER/WATER MIXTURE | 5.0 | 5.0 | 5.0 | 5.0 | 5.0 | 5.0 |
| Emulsifier | None | HLB = 2 | HLB = 4 | HLB = 6 | HLB = 9 | HLB = 12 |

Examples 15–20

Examples 15–20 are the same as the formulations made in Examples 9–14, respectively, except that the flavor can be mixed together with the aqueous bulk sweetener solution before adding the mixture to the gum batch.

Erythritol bulk sweetener can also be blended into various base ingredients. A typical base formula is as follows:

|  | WEIGHT PERCENT |
|---|---|
| Polyvinyl acetate | 27 |
| Synthetic rubber | 13 |
| Paraffin wax | 13 |
| Fat | 3 |
| Glycerol monostearate | 5 |
| Terpene resin | 27 |
| Calcium carbonate filler | 12 |
|  | 100% |

The individual base components can be softened prior to their addition in the base manufacturing process. To the presoftened base component, erythritol can be added and mixed, and then the pre-softened base/bulk sweetener blend can be added to make the finished base. In the following examples, erythritol can be mixed first with one of the base ingredients, and the mixed ingredient can then be used in making a base. The ingredients blended with erythritol can then be used at levels indicated in the typical base formula above.

Example 21

The terpene resin used to make the base is 80% polyterpene resin and 20% erythritol.

Example 22

The polyvinyl acetate used to make the base is 80% low M.W. polyvinyl acetate and 20% erythritol.

Erythritol may also be added to an otherwise complete gum base.

Example 23

Erythritol can be mixed with a gum base having the above listed typical formula at a ratio of 5% erythritol and 95% gum base. The erythritol can be added near the end of the process, after all the other ingredients are added.

The samples of finished base made with erythritol added to different base components can then be evaluated in a sugar-type chewing gum formulated as follows:

TABLE 3

(For examples 21, 22, and 23)

| Sugar | 55.2 |
|---|---|
| Base | 19.2 |
| Corn syrup | 13.4 |
| Glycerine | 1.4 |
| Dextrose monohydrate | 9.9 |
| Peppermint flavor | 0.9 |
|  | 100% |

The theoretical level of erythritol bulk sweetener is 1% in the finished gum.

The following Tables 4 through 11 give examples of gum formulations demonstrating formula variations in which erythritol, in the form of erythritol powder or erythritol syrup, may be used.

Examples 24–28 in Table 4 demonstrate the use of erythritol in low-moisture sugar formulations having less than 2% theoretical moisture.

TABLE 4

|  | EX. 24 | EX. 25 | EX. 26 | EX. 27 | EX. 28 |
|---|---|---|---|---|---|
| SUGAR | 57.9 | 53.9 | 48.9 | 25.0 | 0.0 |
| GUM BASE | 19.2 | 19.2 | 19.2 | 19.2 | 19.2 |
| CORN SYRUP[a] | 6.0 | 6.0 | 6.0 | 6.0 | 6.0 |
| DEXTROSE MONOHY-DRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 5.0 | 8.9 | 8.9 |
| FLAVOR | 0.9 | 0.9 | 0.9 | 0.9 | 0.9 |
| ERYTHRITOL | 1.0 | 5.0 | 10.0 | 25.0 | 50.0 |

[a] Corn syrup is evaporated to 85% solids, 15% moisture
[b] Glycerin and syrup may be blended and co-evaporated Examples 29–33 in Table 5 demonstrate the use of erythritol in medium-moisture sugar formulations having about 2% to about 5% moisture.

TABLE 5

|  | EX. 29 | EX. 30 | EX. 31 | EX. 32 | EX. 33 |
|---|---|---|---|---|---|
| SUGAR | 52.5 | 48.5 | 43.5 | 25.0 | 0.0 |
| GUM BASE | 19.2 | 19.2 | 19.2 | 19.2 | 19.2 |
| CORN SYRUP[a] | 15.0 | 15.0 | 15.0 | 18.5 | 18.5 |
| DEXTROSE MONOHY-DRATE | 10.0 | 10.0 | 10.0 | 11.4 | 11.4 |

TABLE 5-continued

|  | EX. 29 | EX. 30 | EX. 31 | EX. 32 | EX. 33 |
|---|---|---|---|---|---|
| GLYCERIN[b] | 1.4 | 1.4 | 1.4 | 0.0 | 0.0 |
| FLAVOR | 0.9 | 0.9 | 0.9 | 0.9 | 0.9 |
| ERYTHRITOL | 1.0 | 5.0 | 10.0 | 25.0 | 50.0 |

[a]Corn syrup is evaporated to 85% solids, 15% moisture
[b]Glycerin and syrup may be blended and co-evaporated Examples 34–38 in Table 6 demonstrate the use of erythritol in high-moisture sugar formulations having more than about 5% moisture.

TABLE 6

|  | EX. 34 | EX. 35 | EX. 36 | EX. 37 | EX. 38 |
|---|---|---|---|---|---|
| SUGAR | 50.0 | 46.0 | 41.0 | 25.0 | 0.0 |
| GUM BASE | 24.0 | 24.0 | 24.0 | 24.0 | 24.0 |
| CORN SYRUP | 24.0 | 24.0 | 24.0 | 24.6 | 24.6 |
| GLYCERIN | 0.0 | 0.0 | 0.0 | 0.4 | 0.4 |
| FLAVOR | 1.0 | 1.0 | 1.0 | 1.0 | 1.0 |
| ERYTHRITOL | 1.0 | 5.0 | 10.0 | 25.0 | 50.0 |

Examples 39–43 in Table 7 and Examples 44–53 in Tables 8 and 9 demonstrate the use of erythritol in low- and high-moisture gums that are sugar-free. Low-moisture gums have less than about 2% moisture, and high-moisture gums have greater than 2% moisture.

TABLE 7

|  | EX. 39 | EX. 40 | EX. 41 | EX. 42 | EX. 43 |
|---|---|---|---|---|---|
| BASE | 25.5 | 25.5 | 25.5 | 25.5 | 25.5 |
| SORBITOL | 50.0 | 46.0 | 46.0 | 34.0 | 10.0 |
| MANNITOL | 12.0 | 12.0 | 12.0 | 12.0 | 13.0 |

TABLE 7-continued

|  | EX. 39 | EX. 40 | EX. 41 | EX. 42 | EX. 43 |
|---|---|---|---|---|---|
| GLYCERIN | 10.0 | 10.0 | 5.0 | 2.0 | 0.0 |
| FLAVOR | 1.5 | 1.5 | 1.5 | 1.5 | 1.5 |
| ERYTHRITOL | 1.0 | 5.0 | 10.0 | 25.0 | 50.0 |

TABLE 8

|  | EX. 44 | EX. 45 | EX. 46 | EX. 47 | EX. 48 |
|---|---|---|---|---|---|
| BASE | 25.5 | 25.5 | 25.5 | 25.5 | 25.5 |
| SORBITOL | 50.0 | 46.0 | 41.0 | 28.0 | 2.0 |
| SORBITOL LIQUID* | 10.0 | 10.0 | 10.0 | 10.0 | 11.0 |
| MANNITOL | 10.0 | 10.0 | 10.0 | 10.0 | 10.0 |
| GLYCERIN | 2.0 | 2.0 | 2.0 | 0.0 | 0.0 |
| FLAVOR | 1.5 | 1.5 | 1.5 | 1.5 | 1.5 |
| ERYTHRITOL | 1.0 | 5.0 | 10.0 | 25.0 | 50.0 |

*Sorbitol liquid contains 70% sorbitol, 30% water

TABLE 9

|  | EX. 49 | EX. 50 | EX. 51 | EX. 52 | EX. 53 |
|---|---|---|---|---|---|
| BASE | 25.5 | 25.5 | 25.5 | 25.5 | 25.5 |
| SORBITOL | 50.0 | 46.0 | 41.0 | 30.0 | 4.0 |
| HSH SYRUP* | 10.0 | 10.0 | 10.0 | 10.0 | 10.0 |
| MANNITOL | 8.0 | 8.0 | 8.0 | 8.0 | 9.0 |
| GLYCERIN** | 4.0 | 4.0 | 4.0 | 0.0 | 0.0 |
| FLAVOR | 1.5 | 1.5 | 1.5 | 1.5 | 1.5 |
| ERYTHRITOL | 1.0 | 5.0 | 10.0 | 25.0 | 50.0 |

*Lycasin brand hydrogenated starch hydrolysate syrup
**Glycerin and HSH syrup may be blended or co-evaporated Table 10 shows sugar chewing gum formulations that can be made with erythritol and various types of sugars.

TABLE 10

|  | EX. 54 | EX. 55 | EX. 56 | EX. 57 | EX. 58 | EX. 59 |
|---|---|---|---|---|---|---|
| GUM BASE | 19.2 | 19.2 | 19.2 | 19.2 | 19.2 | 19.2 |
| SUCROSE | 44.5 | 24.5 | 39.5 | 19.5 | 29.5 | 19.5 |
| GLYCERIN | 1.4 | 1.4 | 1.4 | 1.4 | 1.4 | 1.4 |
| CORN SYRUP | 14.0 | 14.0 | 14.0 | 14.0 | 14.0 | 14.0 |
| DEXTROSE | 5.0 | 5.0 | — | — | 10.0 | 5.0 |
| LACTOSE | 5.0 | 5.0 | 10.0 | 10.0 | — | — |
| FRUCTOSE | 5.0 | 5.0 | 10.0 | 10.0 | 10.0 | 5.0 |
| INVERT SUGAR | — | — | — | — | 10.0 | 10.0 |
| MALTOSE | — | — | — | — | — | — |
| CORN SYRUP SOLIDS | — | — | — | — | — | — |
| PEPPERMINT FLAVOR | 0.9 | 0.9 | 0.9 | 0.9 | 0.9 | 0.9 |
| ERYTHRITOL | 5.0 | 25.0 | 5.0 | 25.0 | 5.0 | 25.0 |
|  | EX. 60 | EX. 61 | EX. 62 | EX. 63 | EX. 64 | EX. 65 |
| GUM BASE | 19.2 | 19.2 | 19.2 | 19.2 | 19.2 | 19.2 |
| SUCROSE | 29.5 | 19.5 | 29.5 | 19.5 | 37.5 | 22.5 |
| GLYCERIN | 1.4 | 1.4 | 1.4 | 1.4 | 1.4 | 1.4 |
| CORN SYRUP | 14.0 | 14.0 | 14.0 | 14.0 | 11.0 | 11.0 |
| DEXTROSE | 10.0 | 5.0 | 10.0 | 5.0 | 10.0 | 5.0 |
| LACTOSE | — | — | — | — | — | — |
| FRUCTOSE | 10.0 | 5.0 | 10.0 | 5.0 | 5.0 | 5.0 |
| INVERT SUGAR | 10.0 | 10.0 | — | — | 5.0 | 5.0 |
| MALTOSE | — | — | 10.0 | 10.0 | — | — |

TABLE 10-continued

| | | | | | | |
|---|---|---|---|---|---|---|
| CORN SYRUP SOLIDS | — | — | — | — | 5.0 | 5.0 |
| PEPPERMINT FLAVOR | 0.9 | 0.9 | 0.9 | 0.9 | 0.9 | 0.9 |
| ERYTHRITOL | 5.0 | 25.0 | 5.0 | 25.0 | 5.0 | 25.0 |

Any of the sugars may be combined with erythritol and co-dried to form unique combinations such as:

Example 66

Dextrose and erythritol can be dissolved in water in a 2:1 ratio dextrose:erythritol and co-dried or co-precipitated and used in the formulas in Table 10.

Example 67

Erythritol and sucrose can be dissolved in water in a 1:1 ratio and co-dried or co-precipitated and used in the formulas in Table 10.

Example 68

Erythritol, sucrose and dextrose can be dissolved in water in a 1:1:1 ratio and co-dried or co-precipitated and used in the formulas in Table 10.

Example 69

Erythritol, sucrose, dextrose and fructose can be dissolved in water at 25% of each ingredient and co-dried and used in the formulas in Table 10.

Example 70

Erythritol, dextrose, fructose and lactose can be dissolved in water at 25% of each ingredient and co-dried and used in the formulas in Table 10.

Example 71

Erythritol, dextrose, maltose and corn syrup solids can be dissolved in water at 25% of each ingredient and co-dried and used in the formulas in Table 10.

Example 72

Erythritol, sucrose, dextrose, maltose and fructose can be dissolved in water at 20% of each ingredient and co-dried and used in the formulas in Table 10.

Multiple combinations of erythritol with sugars can be made in solution to form liquid concentrates that do not need to be co-dried, such as:

Example 73

Erythritol, corn syrup and glycerin can be dissolved in water at a ratio of 1:1:1, evaporated to a thick syrup and used in the formulas in Table 10.

Example 74

Erythritol, dextrose, fructose and invert syrup may be dissolved in water at 25% of each ingredient and evaporated to a thick syrup and used in the formulas in Table 10.

Example 75

Erythritol, dextrose, maltose and corn syrup solids may be dissolved in water at 25% of each component and evaporated to a thick syrup and used in the formulas in Table 10.

Example 76

Glycerin is added to Example 74 at a ratio of 4:1 syrup to glycerin and evaporated to a thick syrup and used in the formulas in Table 10.

Example 77

Glycerin is added to Example 75 at a ratio of 2:1 syrup to glycerin and evaporated to a thick syrup and used in the formulas in Table 10.

Multiple combinations of two or three sweeteners can also be made by melting a sugar and erythritol at about 130° C., blending, cooling and grinding to form powder blends such as:

Example 78

Dextrose and erythritol are melted at 130° C. and blended at a ratio of 1:1, cooled, ground and used in formulas in Table 10.

Example 79

Dextrose, fructose and erythritol at a ratio of 1:1:1 are blended and melted at 130° C. The melted blend is then mixed, cooled, ground and used in formulas in Table 10.

Table 11 shows chewing gum formulations that are free of sugar. These formulations can use a wide variety of other non-sugar polyols.

TABLE 11

| | EX. 80 | EX. 81 | EX. 82 | EX. 83 | EX. 84 | EX. 85 |
|---|---|---|---|---|---|---|
| GUM BASE | 25.5 | 25.5 | 25.5 | 25.5 | 25.5 | 25.5 |
| GLYCERIN | 2.0 | 2.0 | 2.0 | 2.0 | 2.0 | — |
| SORBITOL | 44.0 | 34.0 | 34.0 | 29.0 | 28.0 | — |
| MANNITOL | — | 10.0 | 10.0 | 10.0 | 10.0 | 8.0 |
| SORBITOL LIQUID | 17.0 | 17.0 | — | — | — | — |
| LYCASIN HSH SYRUP | — | — | 17.0 | 12.0 | 8.0 | 10.0 |
| MALTITOL | — | — | — | 10.0 | — | — |

TABLE 11-continued

|  |  |  |  |  |  |  |
|---|---|---|---|---|---|---|
| XYLITOL | — | — | — | — | 15.0 | 15.0 |
| HYDROGENATED ISOMALTULOSE | — | — | — | — | — | — |
| FLAVOR | 1.5 | 1.5 | 1.5 | 1.5 | 1.5 | 1.5 |
| ERYTHRITOL | 10.0 | 10.0 | 10.0 | 10.0 | 10.0 | 40.0 |

| | EX. 86 | EX. 87 | EX. 88 | EX. 89 | EX. 90 | EX. 91 |
|---|---|---|---|---|---|---|
| GUM BASE | 25.5 | 25.5 | 25.5 | 25.5 | 25.5 | 25.5 |
| GLYCERIN | 8.0 | 8.0 | 8.0 | 2.0 | 3.0 | — |
| SORBITOL | 32.0 | 27.0 | 22.0 | 31.0 | 10.0 | — |
| MANNITOL | 8.0 | 8.0 | 8.0 | — | — | — |
| SORBITOL LIQUID | 5.0 | — | — | — | — | — |
| LYCASIN HSH SYRUP | — | 5.0 | 5.0 | 5.0 | 10.0 | 10.0 |
| MALTITOL | — | 5.0 | — | — | — | — |
| XYLITOL | — | — | — | 15.0 | — | — |
| HYDROGENATED ISOMALTULOSE | — | — | 10.0 | 10.0 | 25.0 | 23.0 |
| FLAVOR | 1.5 | 1.5 | 1.5 | 1.5 | 1.5 | 1.5 |
| ERYTHRITOL | 20.0 | 20.0 | 20.0 | 10.0 | 25.0 | 40.0 |

Any of the polyols can be combined with erythritol and co-dried to form unique combinations, such as:

Example 92

Erythritol and sorbitol can be dissolved in water in a ratio of 2:1 sorbitol:erythritol, co-dried, and used in formulas in Table 11.

Example 93

Erythritol, sorbitol and mannitol can be dissolved in water at a ratio of 1:1:1, co-dried, and used in appropriate formulas in Table 11.

Example 94

Erythritol, mannitol and xylitol can be dissolved in water at a ratio of 1:1:1, co-dried, and used in appropriate formulas in Table 11.

Example 95

Erythritol, hydrogenated isomaltulose and sorbitol can be dissolved in water at a ratio of 1:1:1, co-dried, and used in appropriate formulas in Table 11.

Example 96

Erythritol and hydrogenated isomaltulose can be dissolved in water at a ratio of 1:1, co-dried, and used in appropriate formulas in Table 11.

Example 97

Erythritol, sorbitol, maltitol and xylitol may be blended at 25% of each ingredient and dissolved in water, co-dried, and used in appropriate formulas in Table 11.

Multiple combinations of erythritol with the various polyols can be made in solution to form liquid concentrates that do not need to be co-dried, such as:

Example 98

Erythritol, sorbitol, maltitol and Lycasin HSH syrup may be dissolved in water at 25% of each ingredient, evaporated to a thick syrup and used in the appropriate formulas in Table 11.

Example 99

Erythritol, xylitol, sorbitol and Lycasin HSH syrup can be dissolved in water at 25% of each ingredient, evaporated to a thick syrup, and used in the formulas in Table 11.

Example 100

Erythritol, sorbitol and Lycasin HSH syrup can be dissolved in water at 1:1:1 ratio of each ingredient, evaporated to a thick syrup, and used in the formulas in Table 11.

Example 101

Erythritol, Lycasin HSH syrup and glycerin can be dissolved in water at a ratio of 1:1:1, evaporated to a thick syrup and used in the formulas in Table 11.

Example 102

Glycerin is added to Example 98 at a ratio of 4:1 syrup to glycerin, evaporated to a thick syrup and used in formulas in Table 11.

Example 103

Glycerin is added to Example 99 at a ratio of 4:1 syrup to glycerin, evaporated to a thick syrup and used in the formulas in Table 11.

Example 104

Glycerin is added to Example 100 at a ratio of 4:1 syrup to glycerin, evaporated to a thick syrup and used in formulas in Table 11.

Multiple combinations of one or two polyols with erythritol can be made by melting the polyols together at about 130° C., cooling and grinding to form powder blends, such as:

Example 105

Sorbitol and erythritol are melted at 130° C., blended at a 1:1 ratio, cooled, ground and used in formulas in Table 11.

Example 106

Sorbitol, xylitol and erythritol are blended at a 1:1:1 ratio and melted at 130° C. The blend is cooled, ground and used in formulas in Table 11.

High-intensity sweeteners such as aspartame, acesulfame K, or the salts of acesulfame, cyclamate and its salts, saccharin and its salts, alitame, sucralose, thaumatin, monellin, dihydrochalcones, stevioside, glycyrrhizin, and combinations thereof may be used in any of the Examples listed in Tables 4, 5, 6, 7, 8, 9, 10 and 11. Since erythritol has less sweetness than some of the sugars used in sugar gum, and some of the polyols in sugar-free gum, a high-intensity sweetener may be needed to obtain the proper level of sweetness.

High-intensity sweeteners may also be modified to control their release in chewing gum formulations containing erythritol. This can be controlled by various methods of encapsulation, agglomeration, absorption, or a combination of methods to obtain either a fast or slow release of the sweetener. Sweetener combinations, some of which may be synergistic, may also be included in the gum formulations containing erythritol.

The following examples show the use of high-intensity sweeteners in chewing gum formulations with erythritol.

Example 107

Aspartame at a level of 0.2% may be added to any of the formulas in Tables 4 through 11 by replacing 0.2% of the erythritol.

Example 108

Alitame at a level of 0.03% may be added to any of the formulas in Tables 4 through 11 by replacing 0.03% of the erythritol.

Example 109

Sucralose at a level of 0.07% may be added to any of the formulas in Tables 4 through 11 by replacing 0.07% of the erythritol.

Example 110

Thaumatin at a level of 0.02% may be added to any of the formulas in Tables 4 through 11 by replacing 0.02% of the erythritol.

Example 111

Glycyrrhizin at a level of 0.4% may be added to any of the formulas in Tables 4 through 11 by replacing 0.4% of the erythritol.

High-intensity sweeteners may also be combined with other high-intensity sweeteners, with or without encapsulation, agglomeration or absorption, and used in chewing gums of the present invention. Examples are:

Example 112

Aspartame and acesulfame K at a 1:1 ratio may be added to any of the formulas in Tables 4 through 11 at a level of 0.15% by replacing 0.15% of the erythritol.

Example 113

Aspartame and alitame at a ratio of 9:1 aspartame: alitame may be added to any of the formulas in Tables 4 through 11 at a level of 0.2% by replacing 0.2% of the erythritol.

Example 114

Aspartame and thaumatin at a ratio of 9:1 aspartame:thaumatin can be added to any of the formulas in Tables 4 through 11 at a level of 0.2% by replacing 0.2% of the erythritol.

Example 115

Sucralose and alitame in a ratio of 3:1 sucralose:alitame can be added to any of the formulas in Tables 4 through 11 at a level of 0.1% by replacing 0.1% of the erythritol.

Example 116

Alitame and glycyrrhizin in a ratio of 1:12 alitame:glycyrrhizin can be added to any of the formulas in Tables 4 through 11 at a level of 0.1% by replacing 0.1% of the erythritol.

Example 117

Aspartame and glycyrrhizin in a ratio of 1:14 aspartame:glycyrrhizin can be added to any of the formulas in Tables 4 through 11 at a level of 0.3% by replacing 0.3% of the erythritol.

As discussed above, the various types of erythritol ingredients that are available are erythritol powder and syrup. These materials may be used as the exclusive bulking agent and/or sweetener in a variety of chewing gum formulations, as in Tables 12 and 13.

TABLE 12

|  | EX. 118 | EX. 119 | EX. 120 | EX. 121 | EX. 122 |
|---|---|---|---|---|---|
| GUM BASE | 29.2 | 30.5 | 35.5 | 32.5 | 40.0 |
| ERYTHRITOL | 69.8 | 68.0 | 61.0 | 64.0 | 55.5 |
| GLYCERIN | — | — | 2.0 | 2.0 | 2.0 |
| FLAVOR | 1.0 | 1.5 | 1.5 | 1.5 | 2.5 |

TABLE 13

|  | EX. 123 | EX. 124 | EX. 125 | EX. 126 | EX. 127 | EX. 128 |
|---|---|---|---|---|---|---|
| GUM BASE | 25.5 | 25.5 | 35.5 | 25.5 | 50.0 | 70.0 |
| GLYCERIN | 2.0 | — | 7.0 | 2.0 | 2.0 | 1.0 |
| ERYTHRITOL POWDER | 51.0 | 63.0 | 51.0 | 66.0 | 45.5 | 24.0 |
| ERYTHRITOL SYRUP | 20.0 | 10.0 | 5.0 | 5.0 | — | 2.0 |
| FLAVOR | 1.5 | 1.5 | 1.5 | 1.5 | 2.5 | 3.0 |

The formulations in Tables 12 and 13 do not contain sugars or other polyols. These formulations will give unique texture and flavor attributes. These formulations may also contain high-intensity, artificial sweeteners, from about 0.02% to about 0.1% for sweeteners like alitame, thaumatin and dihydrochalcones, and from about 0.1% to about 0.3% for sweeteners like aspartame, sucralose, acesulfame K and saccharin. The formulations in Tables 12 and 13 without the sugars and other types of polyols will also have good non-cariogenic and low caloric properties.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

What is claimed is:

1. A method of making a chewing gum composition comprising the steps of:
    a) co-crystallizing a solution containing erythritol and another sweetener selected from the group consisting of crystallizable sugar sweeteners, crystallizable polyol sweeteners and mixtures thereof, and
    b) adding the co-crystallized erythritol/sweetener, a gum base and one or more flavoring agents to a mixer and thoroughly mixing the co-crystallized erythritol/sweetener with the gum base and flavoring agents to produce the chewing gum composition.

2. The method of claim 1 wherein the co-crystallized sweetener further comprises a high-intensity sweetener.

3. The method of claim 2 wherein the high intensity sweetener is selected from the group consisting of thaumatin, aspartame, acesulfame K, sodium saccharin, glycyrrhizin, alitame, cyclamate, stevioside, sucralose, dihydrochalcones and mixtures thereof.

4. The method of claim 1 wherein the another sweetener is selected from the group consisting of sucrose, dextrose, fructose, lactose, maltose and mixtures thereof.

5. The method of claim 1 wherein the another sweetener is selected from the group consisting of sorbitol, mannitol, xylitol, maltitol, hydrogenated isomaltulose, lactitol and mixtures thereof.

6. A chewing gum composition comprising a thoroughly mixed mixture of:
    a) a gum base;
    b) one or more flavoring agents; and
    c) a bulking and sweetening agent comprising a co-crystallized combination of erythritol and another sweetener selected from the group consisting of crystallizable sugar sweeteners, crystallizable polyol sweeteners and combinations thereof.

7. The chewing gum composition of claim 6 wherein the co-crystallized combination further comprises a high-intensity sweetener.

8. The chewing gum composition of claim 7 wherein the high-intensity sweetener is selected from the group consisting of thaumatin, aspartame, acesulfame K, sodium saccharin, glycyrrhizin, alitame, cyclamate, stevioside, sucralose, dihydrochalcones and mixtures thereof.

9. The chewing gum composition of claim 7 wherein the another sweetener is selected from the group consisting of sorbitol, mannitol, xylitol, maltitol, hydrogenated isomaltulose, lactitol and mixtures thereof.

10. The chewing gum composition of claim 6 wherein the another sweetener is selected from the group consisting of sucrose, dextrose, fructose, lactose, maltose and mixtures thereof.

* * * * *

UNITED STATES PATENT AND TRADEMARK OFFICE
CERTIFICATE OF CORRECTION

PATENT NO. : 6,264,999 B1
DATED : July 24, 2001
INVENTOR(S) : Robert J. Yatka et al.

It is certified that error appears in the above-identified patent and that said Letters Patent is hereby corrected as shown below:

<u>Title page,</u>
Item [56], References Cited, FOREIGN PATENT DOCUMENTS, delete "5/1992" and substitute -- 8/1992 -- in its place; and delete "5/1989" and substitute -- 2/1989 -- in its place.

Signed and Sealed this

Tenth Day of February, 2004

JON W. DUDAS
*Acting Director of the United States Patent and Trademark Office*